Figure 1:
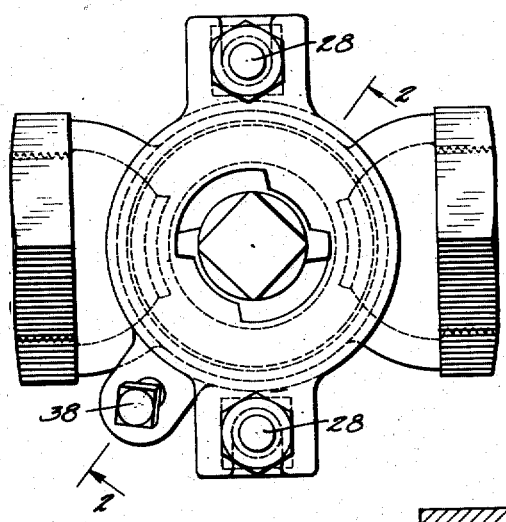

June 25, 1929.

F. MILLIKEN

LUBRICATED VALVE

Re. 17,337

2 Sheets-Sheet 1

Original Filed March 16, 1928

INVENTOR

Foster Milliken

BY

Crusé & Mann

ATTORNEYS

June 25, 1929. F. MILLIKEN Re. 17,337
LUBRICATED VALVE
2 Sheets-Sheet 2
Original Filed March 16, 1928
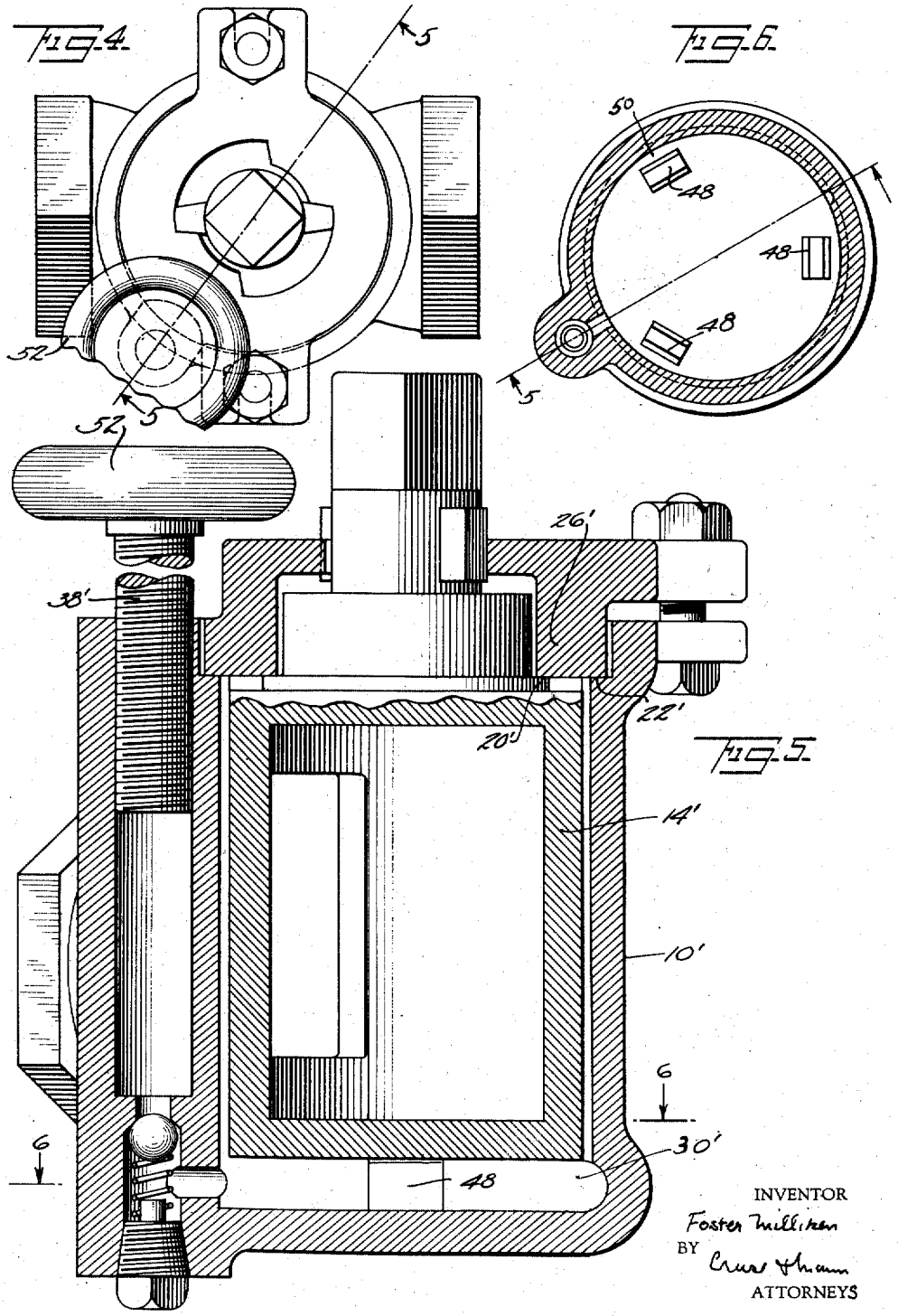
INVENTOR
Foster Milliken
BY Crum & Thomas
ATTORNEYS Reissued June 25, 1929. Re. 17,337

UNITED STATES PATENT OFFICE.

FOSTER MILLIKEN, OF LAWRENCE, NEW YORK, ASSIGNOR TO MILLIKEN VALVE CORPORATION, A CORPORATION OF NEW YORK.

LUBRICATED VALVE.

Original No. 1,696,723, dated December 25, 1928, Serial No. 262,089, filed March 16, 1928. Application for reissue filed April 2, 1929. Serial No. 352,008.

The present invention relates to valves or cocks in which the plug is lubricated. The object of the invention is to produce a valve or cock which can be manufactured quite inexpensively, will operate easily and can be made substantially leak-proof, without the use of packing.

I have found that if the joint at the head of the plug is covered by a member substantially transverse to the axis of the plug, which member bears on a flat surface on the plug, and also makes a substantially leak-proof connection with the body, and a grease groove is provided immediately below such a member, the plug can be turned more easily than the usual plug where the stem is packed, and a higher pressure can be applied to the fluid in the line without leakage. Apparently these results are due to the fact that a thick grease having a high viscosity responds only in part to the laws of fluid bodies, so that if one applies a very high pressure on the grease in one direction, only a small component of such pressure will be delivered in a direction transverse the line of such pressure. Thus if a grease chamber is supplied immediately below such transverse member, it will both lubricate the end of the plug and supply a seal. If there is a movement of liquid from the line between the plug and the seat, creating pressure tending to cause leakage about the plug, such pressure will be transmitted to the grease seal in a direction substantially parallel with the axis of the plug, but for actual leakage to occur the grease must be pushed in a direction transverse the axis of the plug. Because of the tendency of the grease to resist a change in direction of pressure, a relatively high pressure exerted by leaking liquid will not cause the grease to ooze out between the contacting members, even where there is some clearance between them, so that these joints can be made by ordinary machining methods as distinguished from accurately ground joints.

In constructing a valve of this type it is advantageous to be able to apply and maintain considerable pressure to the grease. Accordingly, I supply a grease receiving chamber made integral with the body or casing of the valve, which is supplied with a pressure screw and connected with the operative parts of the valve by a passage provided with a ball check. The grease pressure is utilized to form a seal as has been explained and assists in forcing the lubricant to all moving parts of the apparatus. When means is provided for supplying adequate pressure, I find that a thin film of lubricant can be forced between the contacting surfaces, rendering it unnecessary to move the plug from its seat in order to loosen it. Thus both when the plug is cylindrical and when it is tapered I prefer to hold it positively against endwise movement or movement from its seat, for raising of the plug opens the joints between the plug and body causing the fitting to leak, and allows grit to get between the bearing surface causing scoring and difficult operation.

Figure 3:
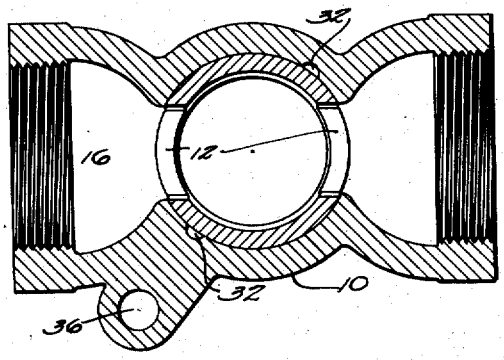
Figure 2:
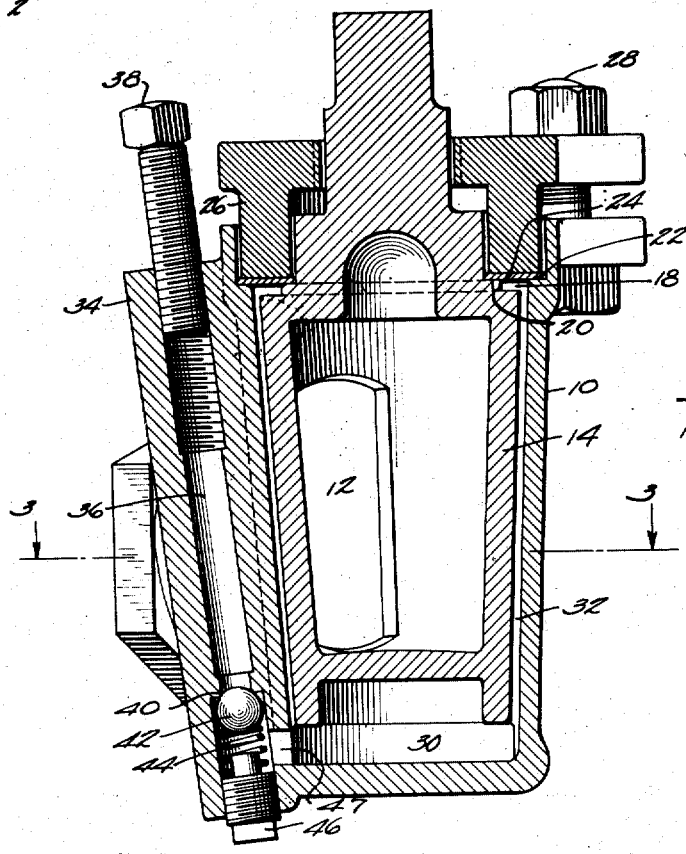

Two forms of plug embodying the principles described are shown in the accompanying drawings, in which Fig. 1 is a plan view of a plug having a tapered seat; Fig. 2 is a section on line 2—2 of Fig. 1, and Fig. 3 is a section on line 3—3 of Fig. 2; Fig. 4 is a plan view of a plug having a cylindrical seat; Fig. 5 is an enlarged section on line 5—5 of Fig. 4, and Fig. 6 is a section on line 6—6 of Fig. 5 drawn on the same scale as Fig. 4.

Referring to Figs. 1 to 3, the casing 10 is shown with threaded pipe connections leading to parts 12, although the valve can be arranged for flanged connections. In the center of the casing is a tapered seat for a plug 14 which has openings 16 adapted to register with the port 12. The top of the plug 14 is provided with a peripheral channel 18 above which is formed a shoulder 20. The casing 10 has a seat 22 which is approximately in line with the shoulder 20 when the plug is in place. The seal of the valve is provided by supplying a member which contacts with the shoulder 20 and the seat 22 and holds grease in the groove 18. In this case such member is a washer 24 preferably made of metal or other relatively stiff material. The washer 24 is held compressed against the shoulder 20 and the seat 22 by the gland 26, which may be held drawn into place by bolts 28.

As shown in Fig. 2 the plug 14 is here illustrated as not reaching all the way to the bottom of the casing 10, leaving a lubricant chamber 30 below the small end of the plug. Grooves 32 are formed adjacent the face of the plug 14 which connect the chamber 30 with the channel 18. In the present embodiment of the invention these grooves are cut in the face of casing 10 and are positioned at an angle of about 54° from the axis leading through the pipe connections 16.

One side of the casing 10 is thickened as indicated at 34 so as to provide space for a substantially vertical lubricant-receiving chamber 36. A portion of the interior of this chamber is threaded to receive a set screw 38 which is adapted to be screwed down to compress the lubricant in the chamber 36. For the purpose of making the top of this set screw more readily accessible, the lubricant chamber 36 here shown is formed at a slight angle from the vertical axis of the plug 14.

Below the bottom of the lubricant chamber 36 is a valve seat 40 adapted to be closed by a ball 42 which is held in place by a spring 44. Spring 44 rests against a plug 46 screwed up from the bottom of the casing in line with the lubricant chamber 36 so that by removing the plug 46 the spring 44 and the ball 42 can be removed leaving a substantially free vertical opening through the lubricant chamber for cleaning the same. A passage 46 leads from the valve chamber at the bottom of the chamber 36 to the lubricant chamber 30. By this construction the lubricant supply mechanism is made integral with the casing 14 so that there is substantially no possibility of leakage in connection with such supply.

When the valve is to be used, lubricant is placed in the chamber 30 and smeared on the sides of the plug 14 which is inserted in place. Additional lubricant is preferably inserted in the grooves 18 and 32. The washer 24 is inserted and the gland 26 forced into place by the bolts 28. Additional lubricant is inserted in the lubricant-receiving chamber 36 from which it may be forced into chamber 30 to keep the parts lubricated at all times. Preferably a grease is used which is highly viscous or semi-solid. If there is any leakage of liquid in the main line, this liquid must go between the face of the plug 14 and the casing 10. As it works upward it will eventually come in contact with the ring of grease contained in the groove 18 and this grease can only be displaced by sideways movement which it will resist owing to the viscosity referred to. Thus the grease will not be forced out of groove 18 even though there are slight inequalities in the contact of washer 24 with shoulder 20 or seat 22. However, a small film of grease will penetrate between the washer 24 and shoulder 20 to lubricate this contact, so that all moving points between the plug and the fixed portions of the casing will be lubricated.

In Figs. 4, 5 and 6 a somewhat similar valve is shown with a cylindrical plug and seat. Parts similar to both types are not specifically described herein but bear the corresponding reference letters, as in connection with Figs. 1 to 3.

The following points may be noted in connection with these figures. Inasmuch as the plug 14′ is cylindrical, a bottom support is necessary which is here supplied by the three lugs 48 which contact with the bottom of the plug and a space is left as indicated at 50 between these lugs and the outer wall of chamber 30′ so that the grease can enter between the plug 14′ and the casing 10′ in the minute space that will be allowed between these two parts. In this connection it may be said that the plug 14′ should be machined so that it will just enter the casing 10 with a very small clearance, as for example a clearance of .0015 inches. I also find it advisable to make the distance from the top of the lugs 48 to the seat 22′ very slightly greater (e. g. one thousandth of an inch) than the distance from the shoulder 20′ to the bottom of the plug, as this will prevent binding.

In this embodiment the washer 24 is eliminated and the gland 26′ contacts directly with the shoulder 20′ and the seat 22′. Obviously either form of construction may be used with either type of plug. Here also the screw 38′ is provided with hand wheel 52. In other particulars the operation of the two forms of mechanism is substantially identical.

With a structure such as has been described, it is not necessary to maintain as accurate a fit between a plug and its seat as with the forms of the device that heretofore have been made and for this reason this sealing arrangement is particularly useful with cylindrical plugs where there is no possibility of taking up the play between the plug and its seat by forcing the plug down into place.

It is to be understood that the examples given are by way of illustration only and that many modifications and changes may be made without departing from the spirit of my invention.

This application is a continuation in part of my earlier application, Serial No. 170,082, filed February 23, 1927.

What I claim is:

1. In a valve having a casing, a plug to fit in said casing and a stem on one end of the plug by which the same may be rotated, a shoulder on the plug adjacent the stem, a seat in the casing approximately in the same plane with the shoulder on the plug, a member adapted to surround said stem and contact with said shoulder and said seat in planes transverse the axis of the plug, means for holding said member pressed against said shoulder and seat, a peripheral groove extending around the plug covered by said member and means for maintaining said groove filled with viscous lubricant.

2. In a device of the type described having a plug and a seat therefor and a stem on the plug whereby the same may be turned, a member adapted to contact with the plug and the casing about such stem in planes transverse the axis of the plug, a lubricant channel in part enclosed by such member and overspreading the line of contact of the plug and the casing, and means for maintaining viscous lubricant under pressure in such channel.

3. A structure as specified in claim 2, in which the plug and seat are substantially cylindrical and means are provided to prevent the plug from moving away from such member.

4. A seal for the line of contact of two relatively rotatable concentric members comprising a groove constituting an enlargement of such line of contact, a member covering such groove and making contact with both of said members in planes transverse the axis of rotation thereof, and means for maintaining viscous material under pressure in such groove.

5. In a valve having a casing, a plug to fit in said casing, a stem on one end of the plug by which the same may be rotated, a shoulder on the plug adjacent the stem having a bearing surface transverse the axis of the plug completely surrounding said stem, a seat in the casing adjacent the top of the plug having a bearing surface transverse the axis of the plug and completely surrounding the top of said seat, a member adapted to contact with both of said transverse bearing surfaces around the entire circumference thereof, means for holding said member pressed against said bearing surfaces, a channel covered by said member and intermediate the rings of contact of said member with said bearing surfaces adapted to supply lubricant to the contacting surfaces of said member and the bearing surface of the plug, viscous lubricant filling said channel and means for putting the lubricant in said channel under pressure.

6. In a valve having a casing, a plug in said casing, a stem on one end of the plug, a shoulder formed on the plug about said stem having a bearing surface transverse the axis of the plug, a seat in the casing in approximately the same plane as said bearing surface, a groove between said seat and said shoulder, a member adapted to contact with said seat and said shoulder and to cover said groove, viscous lubricant filling said groove, a lubricant receiving chamber integral with said casing whereby viscous lubricant under pressure may be forced into said casing, and channels connecting said lubricant receiving chamber with said groove.

7. In a device of the type described having a plug and a seat therefor and a stem on the plug whereby the same may be turned, a member forming a substantially leak-proof connection with the casing and adapted to contact with the plug about such stem in a plane transverse the axis of the plug, a lubricant channel in part enclosed by such member and overspreading the line of contact of the body of the plug and the casing, and means for maintaining viscous lubricant under pressure in said channel.

FOSTER MILLIKEN.